United States Patent
Seki et al.

(10) Patent No.: US 8,285,051 B2
(45) Date of Patent: Oct. 9, 2012

(54) INFORMATION PROCESSING APPARATUS AND METHOD FOR DETECTING ASSOCIATED INFORMATION FROM TIME-SEQUENTIAL INFORMATION

(75) Inventors: Tsutomu Seki, Chiba (JP); Sho Murakoshi, Tokyo (JP); Daisuke Negi, Tokyo (JP)

(73) Assignee: Sony Corporation (JP)

( * ) Notice: Subject to any disclaimer, the term of this patent is extended or adjusted under 35 U.S.C. 154(b) by 973 days.

(21) Appl. No.: 12/075,343

(22) Filed: Mar. 11, 2008

(65) Prior Publication Data

US 2008/0267507 A1  Oct. 30, 2008

(30) Foreign Application Priority Data

Mar. 30, 2007  (JP) ................................. 2007-094012

(51) Int. Cl.
  *G06K 9/00*  (2006.01)
(52) U.S. Cl. ........................................ 382/190; 382/224
(58) Field of Classification Search .................. 382/190, 382/224
See application file for complete search history.

(56) References Cited

U.S. PATENT DOCUMENTS

| | | | | |
|---|---|---|---|---|
| 6,404,925 | B1 * | 6/2002 | Foote et al. | 382/224 |
| 6,865,297 | B2 * | 3/2005 | Loui et al. | 382/224 |
| 6,879,731 | B2 * | 4/2005 | Kang et al. | 382/274 |
| 7,010,174 | B2 * | 3/2006 | Kang et al. | 382/274 |
| 2004/0057517 | A1 * | 3/2004 | Wells | 375/240.16 |
| 2005/0105775 | A1 * | 5/2005 | Luo et al. | 382/115 |
| 2005/0200762 | A1 * | 9/2005 | Barletta et al. | 348/700 |
| 2006/0023946 | A1 * | 2/2006 | Kasutani et al. | 382/190 |
| 2006/0050993 | A1 * | 3/2006 | Stentiford | 382/305 |
| 2006/0115108 | A1 * | 6/2006 | Rodriguez et al. | 382/100 |

FOREIGN PATENT DOCUMENTS

| | | |
|---|---|---|
| JP | 5028717 | 2/1993 |
| JP | 2001-024980 A | 1/2001 |
| JP | 2003069946 A | 3/2003 |
| JP | 2005167453 A | 6/2005 |
| JP | 2007060392 A | 3/2007 |

OTHER PUBLICATIONS

Office Action from Japanese Application No. 2007-094012, dated May 17, 2011.

* cited by examiner

*Primary Examiner* — Hadi Akhavannik
(74) *Attorney, Agent, or Firm* — Lerner, David, Littenberg, Krumholz & Mentlik, LLP

(57) ABSTRACT

An information processing apparatus detects, from time-sequential information continuously supplied for a given period of time, associated information regarding a time at which a piece of information satisfying a predetermined condition is supplied within the given period of time. A dividing section divides the time-sequential information into a plurality of temporally successive information units at predetermined time intervals. A feature value detecting section temporally successively detects feature values of the plurality of temporally successive information units. A change-information detecting section stores the temporally successively detected feature values for a predetermined period of time, and detects a plurality of temporally successive pieces of feature-value-change information on the basis of the stored feature values and a currently detected feature value. The change-information detecting section outputs the plurality of temporally successive pieces of feature-value-change information in sequence to output time-sequential associated information as the associated information.

10 Claims, 10 Drawing Sheets

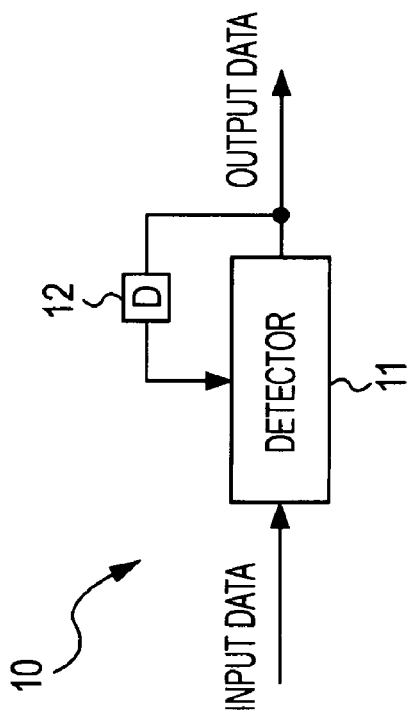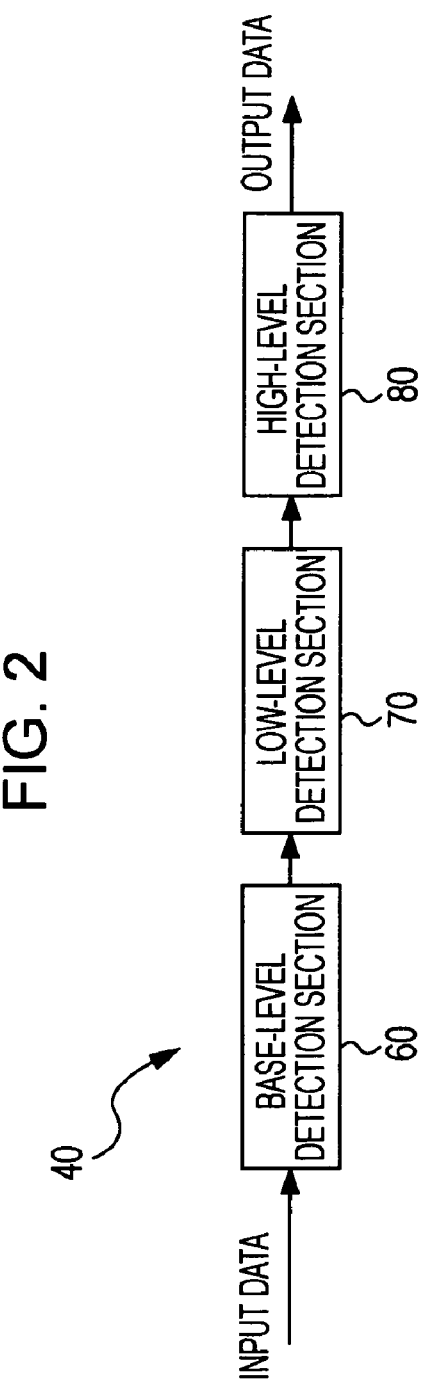

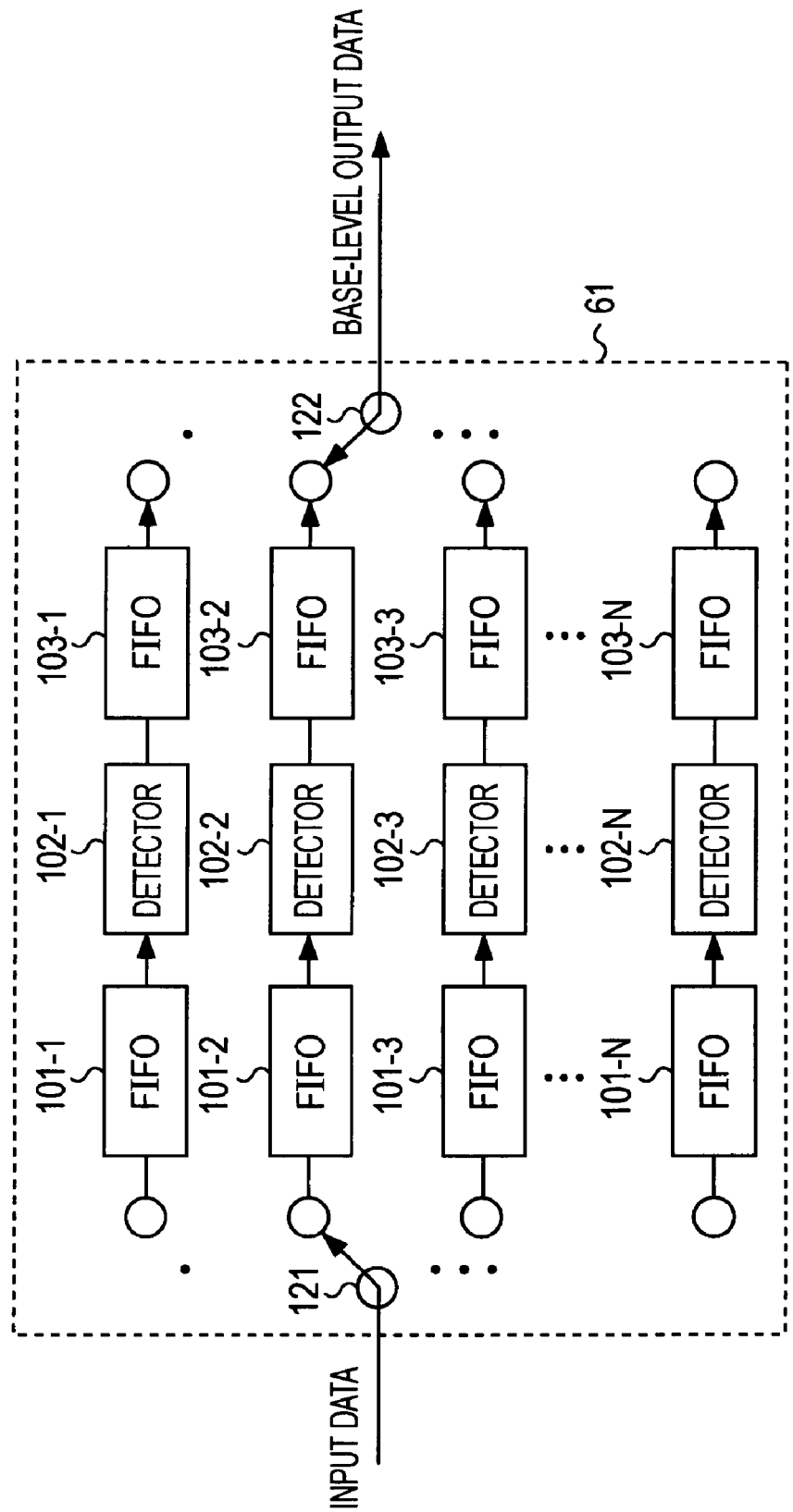

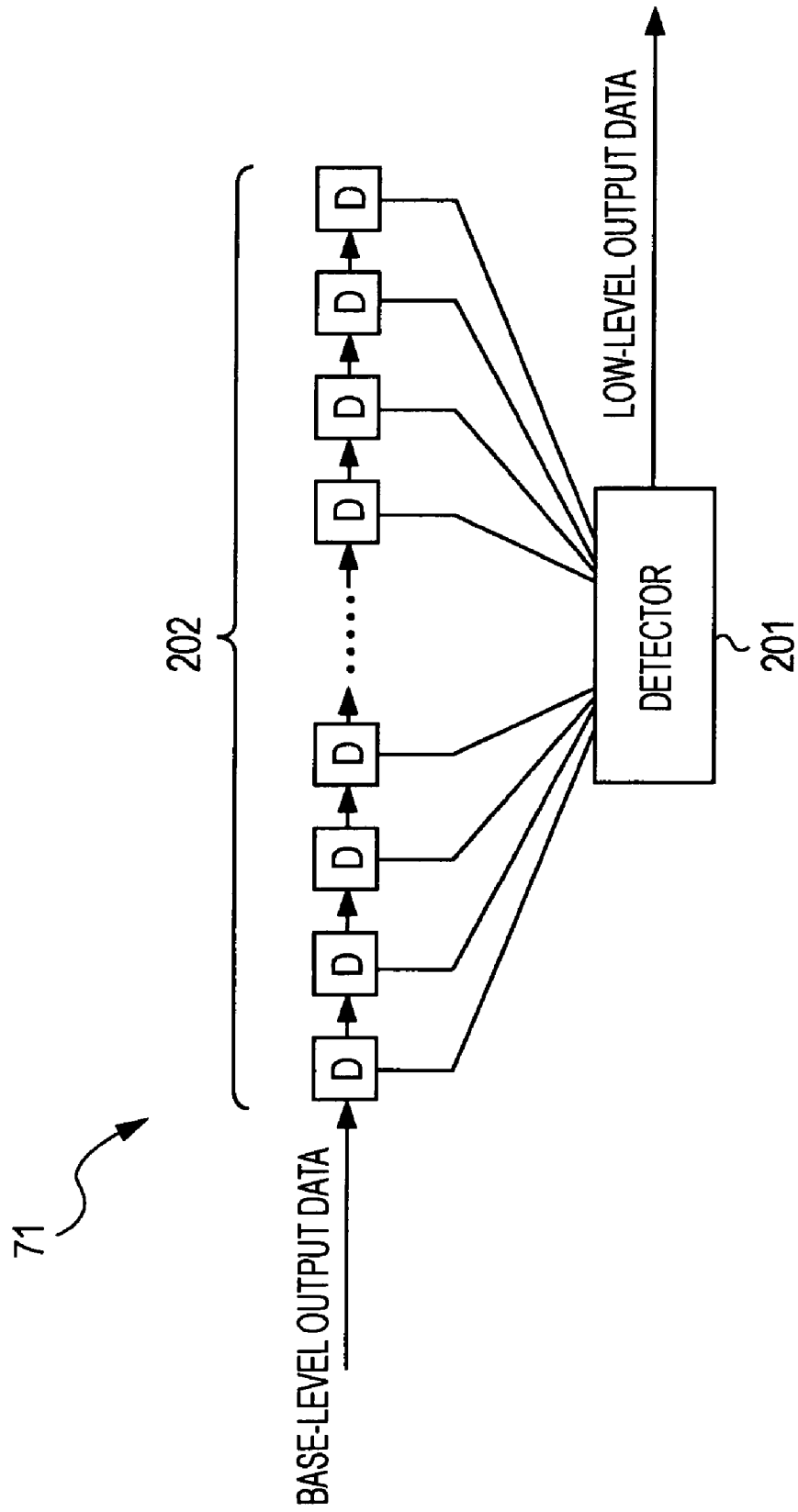

INFORMATION PROCESSING APPARATUS AND METHOD FOR DETECTING ASSOCIATED INFORMATION FROM TIME-SEQUENTIAL INFORMATION

CROSS-REFERENCE TO RELATED APPLICATIONS

The present application claims priority from Japanese Patent Application No. JP 2007-094012, filed in the Japanese Patent Office on Mar. 30, 2007, the entire content of which is incorporated herein by reference.

BACKGROUND OF THE INVENTION

1. Field of the Invention

The present invention relates to information processing apparatuses and methods, and more specifically to an information processing apparatus and method that allow quick extraction of desired data with an inexpensive structure.

2. Description of the Related Art

In processes for extracting metadata from time-series data such as broadcast data, it is important to detect a change in a predetermined feature value detected from input data on the time axis.

A detector for extracting metadata refers to past data on the time axis and compares a predetermined feature value detected from current input data with that of the past data.

FIG. 1 is a diagram showing an example structure of an existing metadata extraction apparatus 10.

In FIG. 1, the metadata extraction apparatus 10 receives, as input data, time-sequential data such as moving image data.

A detector 11 detects a predetermined feature value from the input data and outputs it as output data. The data output from the detector 11 is stored in a delay element 12. The detector 11 compares a predetermined feature value obtained from current input data with feature values stored in the delay element 12 to detect a period of the moving image that satisfies predetermined conditions to thereby extract metadata.

Another technique is to display still images formed of a plurality of slit-shaped images indicating an overview of the images on a display element and to display a visual representation of an overview of audio data corresponding to the slit-shaped images of the still images, such as the sound level and type of sound, in association with the slit-shaped images to allow accurate recognition of the overview of the images and sound to promote more efficient operations such as editing (see Japanese Patent No. 3158291).

SUMMARY OF THE INVENTION

In the comparison between a predetermined feature value detected from current input data and that of past data, however, due to the entry of input data in the order of a monotonous increase in time, it is difficult to perform processing in parallel.

It is therefore desirable to achieve quick extraction of desired data with an inexpensive structure.

An embodiment of the present invention provides an information processing apparatus for detecting, from time-sequential information continuously supplied for a given period of time, associated information regarding a time at which a piece of information satisfying a predetermined condition is supplied. The information processing apparatus includes the following elements. Dividing means divides the time-sequential information into a plurality of temporally successive information units at predetermined time intervals. Feature value detecting means temporally successively detects feature values of the plurality of temporally successive information units. Change-information detecting means stores the feature values temporally successively detected by the feature value detecting means for a predetermined period of time, and detects a plurality of temporally successive pieces of feature-value-change information on the basis of the stored feature values and a current feature value detected by the feature value detecting means. The change-information detecting means outputs the plurality of temporally successive pieces of feature-value-change information in sequence to output time-sequential associated information as the associated information.

The information processing apparatus may further include associated-information detecting means for storing the plurality of temporally successive pieces of feature-value-change information output from the change-information detecting means for a certain period of time and analyzing the stored temporally successive pieces of feature-value-change information to detect time-sequential associated information as the associated information.

The feature value detecting means may further divide each of the plurality of temporally successive information units obtained by the dividing means into information sub-units at shorter time intervals, and may temporally successively detect feature values of the information sub-units.

The dividing means may divide the time-sequential information into a plurality of information units so that the N-th information unit and (N+1)-th information unit of the plurality of information units partially overlap each other by an amount corresponding to the predetermined period of time during which the change-information detecting means stores the feature values.

The temporally successive information units may be information units of a moving image or sound, and the associated information may be detected as metadata of the moving image or sound.

Another embodiment of the present invention provides an information processing method for an information processing apparatus configured to detect, from time-sequential information continuously supplied for a given period of time, associated information regarding a time at which a piece of information satisfying a predetermined condition is supplied. The information processing method includes the steps of dividing the time-sequential information into a plurality of temporally successive information units at predetermined time intervals; temporally successively detecting feature values of the plurality of temporally successive information units; and storing the temporally successively detected feature values for a predetermined period of time to detect a plurality of temporally successive pieces of feature-value-change information on the basis of the stored feature values and a currently detected feature value, wherein the plurality of temporally successive pieces of feature-value-change information are output in sequence to output time-sequential associated information as the associated information.

Accordingly, information supplied continuously in time is divided into a plurality of temporally successive information units at predetermined time intervals; feature values of the plurality of temporally successive information units are temporally successively detected; and the temporally successively detected feature values are stored for a predetermined period of time to detect a plurality of temporally successive pieces of feature-value-change information on the basis of the stored feature values and a currently detected feature value. The plurality of temporally successive pieces of featurevalue-change information are output in sequence to output time-sequential associated information.

Another embodiment of the present invention provides an information processing apparatus for detecting, from time-sequential information continuously supplied for a given period of time, associated information regarding a time at which a piece of information satisfying a predetermined condition is supplied. The information processing apparatus includes the following elements. Dividing means divides the time-sequential information into a plurality of temporally successive information units at predetermined time intervals. Change-information detecting means temporally successively detects feature values of the plurality of temporally successive information units, stores the temporally successively detected feature values for a predetermined period of time, and detects a plurality of temporally successive pieces of feature-value-change information on the basis of the stored feature values and a currently detected feature value. Associated-information detecting means stores the plurality of temporally successive pieces of feature-value-change information output in sequence from the change-information detecting means for a certain period of time, and analyzes the stored temporally successive pieces of feature-value-change information to detect time-sequential associated information as the associated information.

The dividing means may divide the time-sequential information into a plurality of information units so that the N-th information unit and (N+1)-th information unit of the plurality of information units partially overlap each other by an amount corresponding to the predetermined period of time during which the change-information detecting means stores the feature values.

The temporally successive information units may be information units of a moving image or sound, and the associated information may be detected as metadata of the moving image or sound.

Another embodiment of the present invention provides an information processing method for an information processing apparatus configured to detect, from time-sequential information continuously supplied for a given period of time, associated information regarding a time at which a piece of information satisfying a predetermined condition is supplied. The information processing method includes the steps of dividing the time-sequential information into a plurality of temporally successive information units at predetermined time intervals; temporally successively detecting feature values of the plurality of temporally successive information units, storing the temporally successively detected feature values for a predetermined period of time, and detecting a plurality of temporally successive pieces of feature-value-change information on the basis of the stored feature values and a currently detected feature value; and storing the plurality of temporally successive pieces of feature-value-change information output in sequence for a certain period of time and analyzing the stored temporally successive pieces of feature-value-change information to detect time-sequential associated information as the associated information.

Accordingly, time-sequential information is divided into a plurality of temporally successive information units at predetermined time intervals; feature values of the plurality of temporally successive information units are temporally successively detected; the temporally successively detected feature values are stored for a predetermined period of time to detect a plurality of temporally successive pieces of feature-value-change information on the basis of the stored feature values and a currently detected feature value; the detected plurality of temporally successive pieces of feature-value-change information are stored for a certain period of time; and the stored temporally successive pieces of feature-value-change information are analyzed to detect time-sequential associated information.

According to an embodiment of the present invention, therefore, desired data can be quickly extracted with an inexpensive structure.

BRIEF DESCRIPTION OF THE DRAWINGS

FIG. 1 is a block diagram showing an example structure of an existing metadata extraction apparatus;

FIG. 2 is a block diagram showing an example structure of a metadata extraction apparatus according to an embodiment of the present invention;

FIG. 3 is a block diagram showing an example structure of a base-level detector;

FIG. 4 is a block diagram showing an example structure of a low-level detector;

DESCRIPTION OF THE PREFERRED EMBODIMENTS

Figure 5:
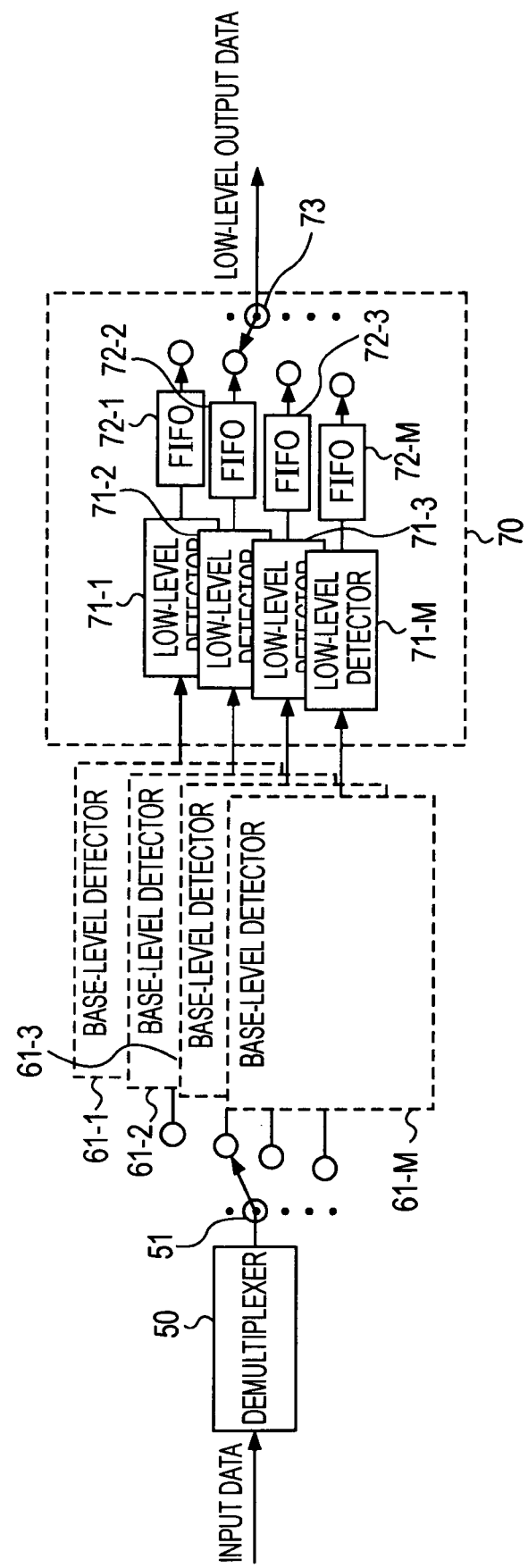
FIG. 5 is a block diagram showing a structure of a low-level detection section shown in FIG. 2.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An embodiment of the present invention provides an information processing apparatus for detecting, from time-sequential information continuously supplied for a given period of time, associated information (e.g., metadata) regarding a time at which a piece of information satisfying a predetermined condition is supplied within the given period of time. The information processing apparatus includes the following elements. Dividing means (e.g., a demultiplexer 50 shown in FIG. 5) divides the time-sequential information into a plurality of temporally successive information units at predetermined time intervals. Feature value detecting means (e.g., a base-level detection section 60 shown in FIG. 2) temporally successively detects feature values of the plurality of temporally successive information units. Change-information detecting means (e.g., a low-level detection section 70 shown in FIG. 2) stores the feature values temporally successively detected by the feature value detecting means for a predetermined period of time, and detects a plurality of temporally successive pieces of feature-value-change information (e.g., intermediate data) on the basis of the stored feature values and a current feature value detected by the feature value detecting means. The change-information detecting means outputs the plurality of temporally successive pieces of feature-value-change information in sequence to output time-sequential associated information as the associated information.

The information processing apparatus may further include associated-information detecting means (e.g., a high-level detection section 80 shown in FIG. 2) for storing the plurality of temporally successive pieces of feature-value-change information detected by the change-information detecting means for a certain period of time and analyzing the stored temporally successive pieces of feature-value-change information to detect time-sequential associated information as the associated information.

Another embodiment of the present invention provides an information processing method for an information processing apparatus configured to detect, from time-sequential information continuously supplied for a given period of time, associated information (e.g., metadata) regarding a time at which a piece of information satisfying a predetermined condition is supplied within the given period of time. The information processing method includes the steps of dividing the time-sequential information into a plurality of temporally successive information units at predetermined time intervals (e.g., the processing of step S10 shown in FIG. 8); temporally successively detecting feature values of the plurality of temporally successive information units (e.g., the processing of step S11 shown in FIG. 8); and storing the temporally successively detected feature values for a predetermined period of time to detect a plurality of temporally successive pieces of feature-value-change information (e.g., intermediate data) on the basis of the stored feature values and a currently detected feature value (e.g., the processing of step S12 shown in FIG. 8), wherein the plurality of temporally successive pieces of feature-value-change information are output in sequence to output time-sequential associated information as the associated information.

Another embodiment of the present invention provides an information processing apparatus for detecting, from time-sequential information continuously supplied for a given period of time, associated information (e.g., metadata) regarding a time at which a piece of information satisfying a predetermined condition is supplied within the given period of time. The information processing apparatus includes the following elements. Dividing means (e.g., a demultiplexer 50 shown in FIG. 5) divides the time-sequential information into a plurality of temporally successive information units at predetermined time intervals. Change-information detecting means (e.g., a low-level detection section 70 shown in FIG. 13) temporally successively detects feature values of the plurality of temporally successive information units, stores the temporally successively detected feature values for a predetermined period of time, and detects a plurality of temporally successive pieces of feature-value-change information (e.g., intermediate data) on the basis of the stored feature values and a currently detected feature value. Associated-information detecting means (e.g., a high-level detection section 80 shown in FIG. 13) stores the plurality of temporally successive pieces of feature-value-change information detected by the change-information detecting means for a certain period of time, and analyzes the stored temporally successive pieces of feature-value-change information to detect time-sequential associated information as the associated information.

Another embodiment of the present invention provides an information processing method for an information processing apparatus configured to detect, from time-sequential information continuously supplied for a given period of time, associated information (e.g., metadata) regarding a time at which a piece of information satisfying a predetermined condition is supplied within the given period of time. The information processing method includes the steps of dividing the time-sequential information into a plurality of temporally successive information units at predetermined time intervals (e.g., the processing of step S10 shown in FIG. 8); temporally successively detecting feature values of the plurality of temporally successive information units, storing the temporally successively detected feature values for a predetermined period of time, and detecting a plurality of temporally successive pieces of feature-value-change information (e.g., intermediate data) on the basis of the stored feature values and a currently detected feature value (e.g., the processing of steps S11 and S12 shown in FIG. 8); and storing the detected plurality of temporally successive pieces of feature-value-change information for a certain period of time and analyzing the stored temporally successive pieces of feature-value-change information to detect time-sequential associated information as the associated information (e.g., the processing of step S13 shown in FIG. 8).

Embodiments of the present invention will be described hereinafter with reference to the drawings.

FIG. 2 is a block diagram showing an example structure of a metadata extraction apparatus 40 according to an embodiment of the present invention. The metadata extraction apparatus 40 extracts metadata from time-sequential data input as input data, and outputs, as output data, data in which the metadata is associated with the input data.

The input data is time-sequential data such as moving image data and audio data. The metadata is information for specifying a period satisfying predetermined conditions in the input data such as moving image data and audio data. For example, the input data is data of content including moving images and sound, and the metadata is information for specifying a period such as a period of a highlight scene or a period of an advertisement in the content. The metadata extraction apparatus 40 is implemented by, for example, a hard disk drive (HDD) recorder, and is adapted to extract metadata of content recorded on an HDD to present the metadata to a user as desired.

Referring to FIG. 2, the metadata extraction apparatus 40 includes a base-level detection section 60, a low-level detection section 70, and a high-level detection section 80.

The base-level detection section 60 is configured to detect a feature value from the input data. The base-level detection section 60 receives an input of image and audio data of, for example, every frame, and detects a feature value such as information indicating a histogram of brightness of an image of the frame, information indicating contrast of the image of the frame, or information indicating an audio level. The base-level detection section 60 outputs data associating the detected feature value with the position (time) of the frame of the input data, called base-level output data, to the low-level detection section 70.

The base-level detection section 60 does not include a buffer such as a delay element. For example, when image and audio data of the first frame is input, the base-level detection section 60 detects a feature value of the image and audio data of the first frame and outputs base-level output data. When image and audio data of the second frame is input, the base-level detection section 60 detects a feature value of the image and audio data of the second frame and outputs base-level output data.

The low-level detection section 70 is configured to detect intermediate data, such as information indicating whether a scene change occurs in the content, or information indicating whether or not a period during which an audio level exceeds a predetermined threshold value for a predetermined period of time or more (or a silent period more than or equal to a predetermined period of time) exists, on the basis of the base-level output data output from the base-level detection section 60. The low-level detection section 70 outputs data associating the detected intermediate data with the corresponding period of the input data, called low-level output data, to the high-level detection section 80.

The low-level detection section 70 includes a buffer such as a delay element capable of storing base-level output data corresponding to successive input data frames of, for example, five seconds. For example, the low-level detection section 70 compares current input base-level output data with base-level output data stored in the buffer to detect intermediate data, and outputs low-level output data.

The high-level detection section 80 is configured to detect metadata, such as information for specifying a period such as a period of a highlight scene or a period of an advertisement in the content, on the basis of the low-level output data output from the low-level detection section 70, and outputs data associating the detected metadata with the corresponding period of the input data, called high-level output data. The high-level output data is therefore output data of the metadata extraction apparatus 40.

The high-level detection section 80 includes a buffer such as a delay element capable of storing low-level output data corresponding to successive input data frames of, for example, several tens of minutes. For example, the high-level detection section 80 compares a predetermined period in the low-level output data stored in the buffer with other periods or compares current input low-level output data with low-level output data stored in the buffer to detect metadata, and outputs high-level output data.

The buffer of the high-level detection section 80 is configured to store data (low-level output data) corresponding to input data of a sufficiently longer time than the time of input data corresponding to the data (base-level output data) stored in the buffer of the low-level detection section 70.

The base-level detection section 60 includes no buffer, whereas the low-level detection section 70 includes a buffer with a finite delay period and the high-level detection section 80 includes a buffer with an infinite delay period. As is to be understood, the capacity of the buffer of the high-level detection section 80 is actually finite. However, the buffer of the high-level detection section 80 is capable of storing data of a time length sufficiently longer than that of the buffer of the low-level detection section 70, and can therefore be regarded as a buffer with an infinite delay period.

FIG. 3 is a block diagram showing an example structure of a base-level detector 61 of the base-level detection section 60.

The base-level detector 61 shown in FIG. 3 includes detectors connected in parallel, each detector being configured to detect a feature value from input image and audio data of, for example, one frame, such as information indicating a histogram of brightness of an image of the frame, information indicating contrast of the image of the frame, or information indicating an audio level. In FIG. 3, N detectors, namely, detectors 102-1 to 102-N, are connected in parallel.

Input data is supplied in sequence to first-in first-outs (FIFOs) 101-1 to 101-N by a switch 121. For example, data of the first frame of input data or content is input to the FIFO 101-1, data of the second frame is input to the FIFO 101-2, data of the third frame is input to the FIFO 101-3, and data of the N-th frame is input to the FIFO 101-N. Data of the (N+1)-th frame is input to the FIFO 101-1 again.

The detectors 102-1 to 102-N read image and audio data of, for example, one frame from the FIFOs 101-1 to 101-N, respectively, to detect feature values such as information indicating histograms of brightness of images of the corresponding frames, information indicating contrast of the images of the corresponding frames, or information indicating audio levels. The detectors 102-1 to 102-N output data associating the detected feature values with the positions of the corresponding frames of the input data to FIFOs 103-1 to 103-N, respectively.

A switch 122 reads data in sequence from the FIFOs 103-1 to 103-N, and outputs base-level output data. The base-level output data is thus output as data corresponding to input data of N temporally successive frames by way of example.

A plurality of base-level detectors 61 are connected in parallel to construct the base-level detection section 60.

FIG. 4 is a block diagram showing an example structure of a low-level detector 71 of the low-level detection section 70. As shown in FIG. 4, the low-level detector 71 has a finite impulse response (FIR) filter structure.

In FIG. 4, the low-level detector 71 includes a finite delay buffer 202 including a plurality of delay elements D connected in series. The finite delay buffer 202 is configured so that input data is output from the delay elements D in sequence from left to right as viewed in FIG. 4. One of the delay elements D in the finite delay buffer 202 that is located on the right side as viewed in FIG. 4 stores temporally earlier data, and one of the delay elements D that is located on the left side as viewed in FIG. 4 stores temporally later data.

A detector 201 compares, for example, temporally earlier base-level output data in the content corresponding to image and audio data (input data) of, for example, several seconds (for example, several tens of frames) stored in a predetermined number of successive delay elements D in the finite delay buffer 202 that are located on the right side as viewed in FIG. 4 with temporally later base-level output data in the content corresponding to image and audio data of a time length (for example, several hundreds of frames) which is several times that of the temporally earlier base-level output data, which is stored in a predetermined number of successive delay elements D in the finite delay buffer 202 that are located on the left side as viewed in FIG. 4, to detect intermediate data, such as information indicating whether or not a scene change occurs between the first several-second period and the next several-second period in the content, or information indicating whether or not a period exists during which an audio level increases (or decreases) over a predetermined threshold value, on the basis of the result of comparison.

Data associating the intermediate data detected by the detector 201 with the corresponding period of the input data is output as low-level output data. The low-level output data is thus data indicating whether or not a scene change occurs, whether or not an audio level increases or decreases over a predetermined threshold value, or the like for each of a plurality of periods extracted in sequence at predetermined time intervals in time-sequential input data. Like the input data, the low-level output data is also time-sequential data.

A plurality of low-level detectors 71 are connected in parallel to construct the low-level detection section 70.

The parallel connection of the low-level detectors 71 will be specifically described. FIG. 5 is a block diagram showing an example structure of the low-level detection section 70. In the example shown in FIG. 5, M low-level detectors 71 are connected in parallel to construct the low-level detection section 70.

In FIG. 5, M base-level detectors 61-1 to 61-M have a similar structure to that of the base-level detectors 61 described above with reference to FIG. 3. A demultiplexer 50 is connected to a parallel connection of the M base-level detectors 61-1 to 61-M. The demultiplexer 50 switches a switch 51 to supply input data of a predetermined period in sequence to the base-level detectors 61-1 to 61-M.

The demultiplexer 50 divides time-sequential input data into entry units of, for example, several tens of seconds, and supplies data of the first entry unit to the base-level detector 61-1, data of the second entry unit to the base-level detector 61-2, data of the third entry unit to the base-level detector 61-3, and data of the M-th entry unit to the base-level detector 61-M. Data of the (M+1)-th entry unit is supplied to the base-level detector 61-1 again.

As described above with reference to FIG. 3, each of the base-level detectors 61-1 to 61-M is provided with the detectors 102-1 to 102-N. A single base-level detector 61 outputs base-level output data corresponding to input data of N temporally successive frames by way of example.

The low-level detectors 71-1 to 71-M have a structure similar to that of the low-level detectors 71 described above with reference to FIG. 4. The low-level detectors 71-1 to 71-M detect intermediate data as described above on the basis of the base-level output data output from the base-level detectors 61-1 to 61-M, respectively, and output low-level output data to FIFOs 72-1 to 72-M, respectively.

A switch 73 reads data in sequence from the FIFOs 72-1 to 72-M, and outputs low-level output data. When the switch 73 reads data once in sequence from the FIFOs 72-1 to 72-M, low-level output data is output as data corresponding to, for example, time-sequential input data of M×several tens of seconds.

Accordingly, the base-level detection section 60 includes the plurality of base-level detectors 61 connected in parallel, and the low-level detection section 70 includes the plurality of low-level detectors 71 connected in parallel.

As described above with reference to FIG. 3, each of the base-level detectors 61 is provided with N detectors 102. In the metadata extraction apparatus 40 having the structure described above, therefore, N×M detectors 102 are connected in parallel to construct the base-level detection section 60. The N×M detectors 102 can detect feature values from input data in parallel.

The demultiplexer 50 may be formed as a part of the base-level detection section 60, or may be provided independently.

Figure 6:
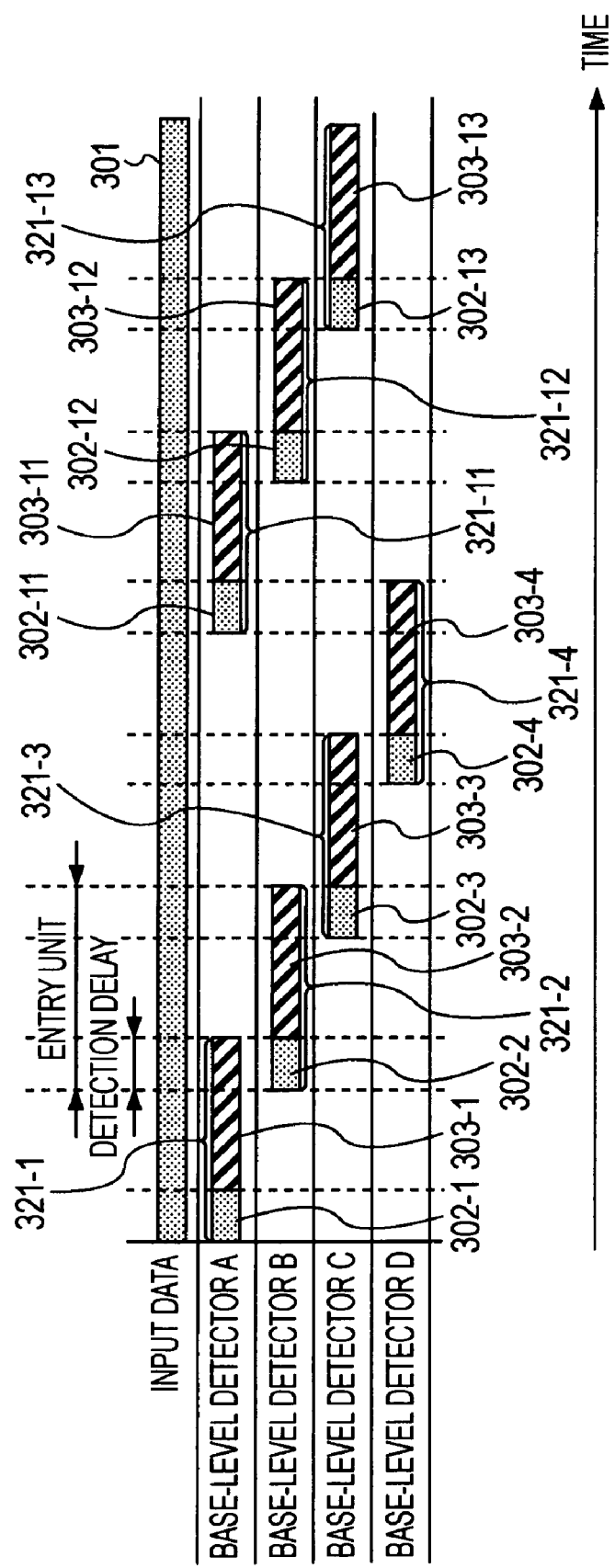
FIG. 6 is a diagram showing a system of supplying input data using a demultiplexer shown in FIG. 5.

FIG. 6 is a diagram showing a system of supplying input data using the demultiplexer 50 shown in FIG. 5.

In FIG. 6, the horizontal axis represents time. Input data 301 shown in FIG. 6 is time-sequential input data (audio and image data) input to the demultiplexer 50. The demultiplexer 50 divides the input data 301 into a plurality of entry units of data each having a time length shown in FIG. 6, and supplies the entry units of data in sequence to the plurality of base-level detectors 61. For ease of description, it is assumed that the base-level detection section 60 includes four base-level detectors, namely, base-level detectors 61A to 61D.

In this example, an entry unit of data 321-1 is supplied to the base-level detector 61A, an entry unit of data 321-2 is supplied to the base-level detector 61B, an entry unit of data 321-3 is supplied to the base-level detector 61C, and an entry unit of data 321-4 is supplied to the base-level detector 61D. An entry unit of data 321-11 is supplied to the base-level detector 61A, an entry unit of data 321-12 is supplied to the base-level detector 61B, and an entry unit of data 321-13 is supplied to the base-level detector 61C.

As in the case described above with reference to FIG. 5, in a case where low-level detectors are connected in parallel, base-level output data output from each of the base-level detectors 61A to 61D has a time length equal to that of an entry unit of data. The base-level detectors 61A to 61D supply base-level output data to low-level detectors 71A to 71D, respectively.

As described above with reference to FIG. 4, the detector 201 of the low-level detector 71 compares temporally earlier data (base-level output data) stored in the buffer 202 with temporally later data to detect intermediate data, such as information indicating whether or not a scene change occurs between the first several-second, period and the next several-second period in the content, or information indicating whether or not a period exists during which an audio level increases (or decreases) over a predetermined threshold value, on the basis of the result of comparison. In other words, no intermediate data is detected until data has been completely stored in the buffer 202. In FIG. 6, a detection delay represents the time elapsed until data has been completely stored in the buffer 202.

Specifically, the base-level output data output from the base-level detector 61A in response to the entry unit of data 321-1 is supplied to the low-level detector 71A. A base-level output data portion corresponding to a period 302-1 is a detection delay portion, and no intermediate data is detected. In a period 303-1 subsequent to the period 302-1, intermediate data is detected by the low-level detector 71A.

Base-level output data portions corresponding to periods 302-2, 302-3, and 302-4, etc., are also detection delay portions, and no intermediate data is detected. In periods 303-2, 303-3, and 303-4, etc., intermediate data is detected by the low-level detectors 71B, 71C, and 71D.

Thus, intermediate data corresponding to the periods 303-1, 303-2, 303-3, 303-4, 303-11, 303-12, and 303-13 is continuously detected and output to output low-level output data from the low-level detection section 70 as time-sequential data in which intermediate data a period of the input data are associated with each other.

The demultiplexer 50 divides each of the entry units of data to be supplied to a plurality of base-level detectors so that the entry units of data are made partially redundant (or partially overlap), and supplies the entry units of data.

Specifically, the entry units of data generated from the input data 301 are supplied so that a portion (right portion as viewed in FIG. 6) of the entry unit of data 321-1 to be supplied to the base-level detector 61A, which has the same time length as the period 302-2, is also redundantly supplied to the base-level detector 61B. Likewise, a portion (right portion as viewed in FIG. 6) of the entry unit of data 321-2, which has the same time length as the period 302-3, is also redundantly supplied. The same applies to the entry units of data 321-3, and the other entry units of data.

In this way, the demultiplexer 50 divides the input data 301 into entry units of data so that, for example, the K-th entry unit of data and the (K+1)-th entry unit of data overlap each other by an amount corresponding to the time of detection delay.

Accordingly, base-level detection data units processed in parallel by and output from the base-level detection section 60 including no buffer can be processed in parallel by the low-level detection section 70 including a buffer with a finite delay period to output time-sequential low-level detection data.

Preferably, the low-level detection section 70 is designed so that the time length of detection delay can be sufficiently reduced with respect to the time length of the overall entry units of data to minimize a load related to the processing of the redundant portions to achieve an efficient overall operation of the metadata extraction apparatus 40.

Figure 7:
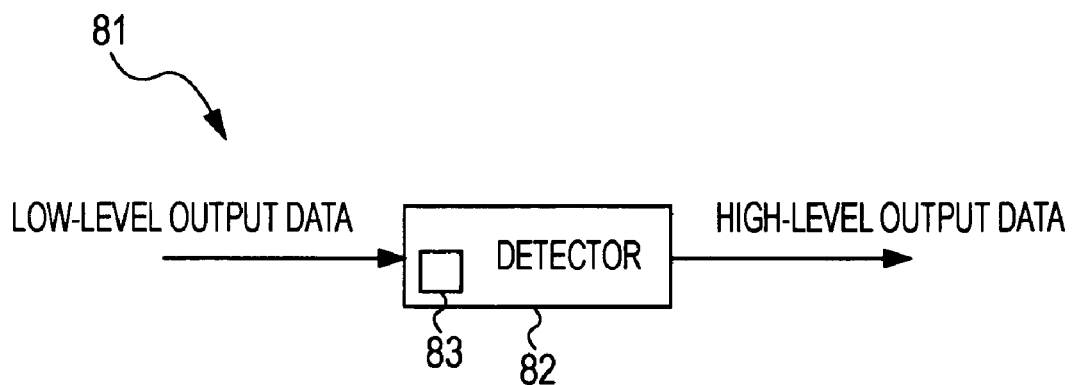
FIG. 7 is a block diagram showing an example structure of a high-level detector.

FIG. 7 is a block diagram showing an example structure of a high-level detector 81 of the high-level detection section 80. As shown in FIG. 7, the high-level detector 81 has an infinite impulse response (IIR) filter structure.

Referring to FIG. 7, a detector 82 stores time-sequential low-level output data input to the high-level detector 81 in a buffer 83, and compares a certain period in the stored low-level output data with other periods to detect, as metadata, information for specifying a period such as a period of a highlight scene or a period of an advertisement in the content. Data associating the detected metadata with the corresponding period of the input data is output as high-level output data.

As described above, the buffer 83 is capable of storing time-sequential low-level output data of, for example, several tens of minutes.

In a metadata extraction process, for example, past data is referred to in time-sequential content data and is compared with a predetermined feature value detected from current input data. In this case, due to the entry of input data in the order of a monotonous increase in time, it is very difficult to perform processing in parallel. An existing metadata extraction apparatus performs such a metadata extraction process using a detector having a buffer with a very large capacity. This increases the amount of time for the process and causes difficulty in reducing the cost of the apparatus.

According to the metadata extraction apparatus 40 of the embodiment of the present invention, on the other hand, input data is analyzed in three stages to extract metadata. This enables parallel processing and a reduction in the processing time. According to an embodiment of the present invention, the base-level detection section 60 operable to extract a feature value or the like directly from input data without using a buffer, and the low-level detection section 70 operable to perform processing using a buffer with a finite delay period have a parallel configuration which reduces the processing time.

According to the metadata extraction apparatus 40 of the embodiment of the present invention, furthermore, input data is analyzed in three stages to extract metadata, thus enabling a reduction in the capacity of a buffer and a reduction in the cost of the apparatus. Specifically, the base-level detection section 60 includes no buffer, and the low-level detection section 70 includes only a buffer with a finite delay period. As with an existing metadata extraction apparatus, the high-level detection section 80 includes a buffer with an infinite delay period. However, unlike the existing metadata extraction apparatus, the size of data stored in the buffer of the high-level detection section 80 can be greatly reduced.

While an existing metadata extraction process uses a buffer having a capacity of storing input data for a very long time, the buffer of the high-level detection section 80 (i.e., the buffer 83) has only a capacity of, for example, storing intermediate data with information specifying a period of the input data, namely, low-level output data, for a very long time.

Figure 8:
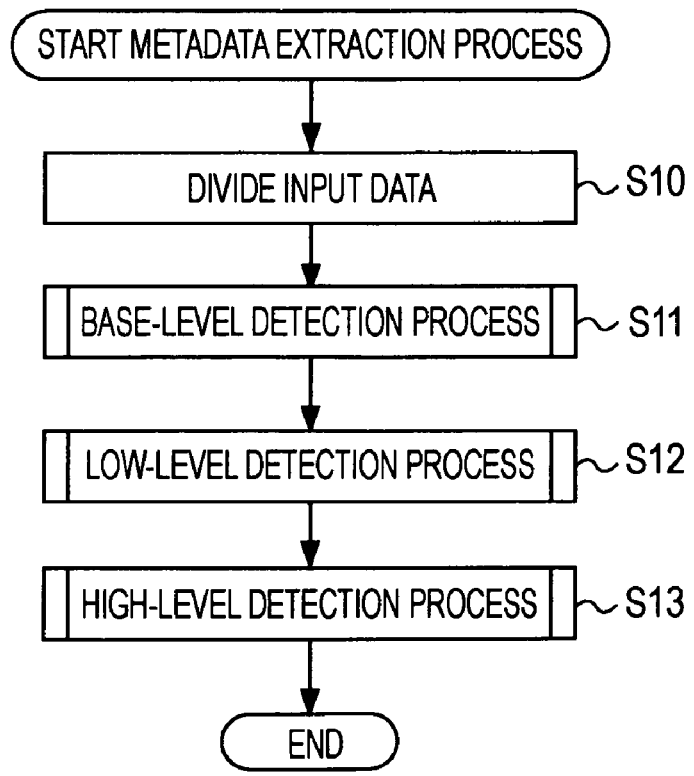
FIG. 8 is a flowchart showing an example of a metadata extraction process.

A metadata extraction process performed by the metadata extraction apparatus 40 will be described with reference to a flowchart shown in FIG. 8.

In step S10, the demultiplexer 50 divides input data into entry units of data in the manner described above with reference to FIG. 6.

Figure 9:
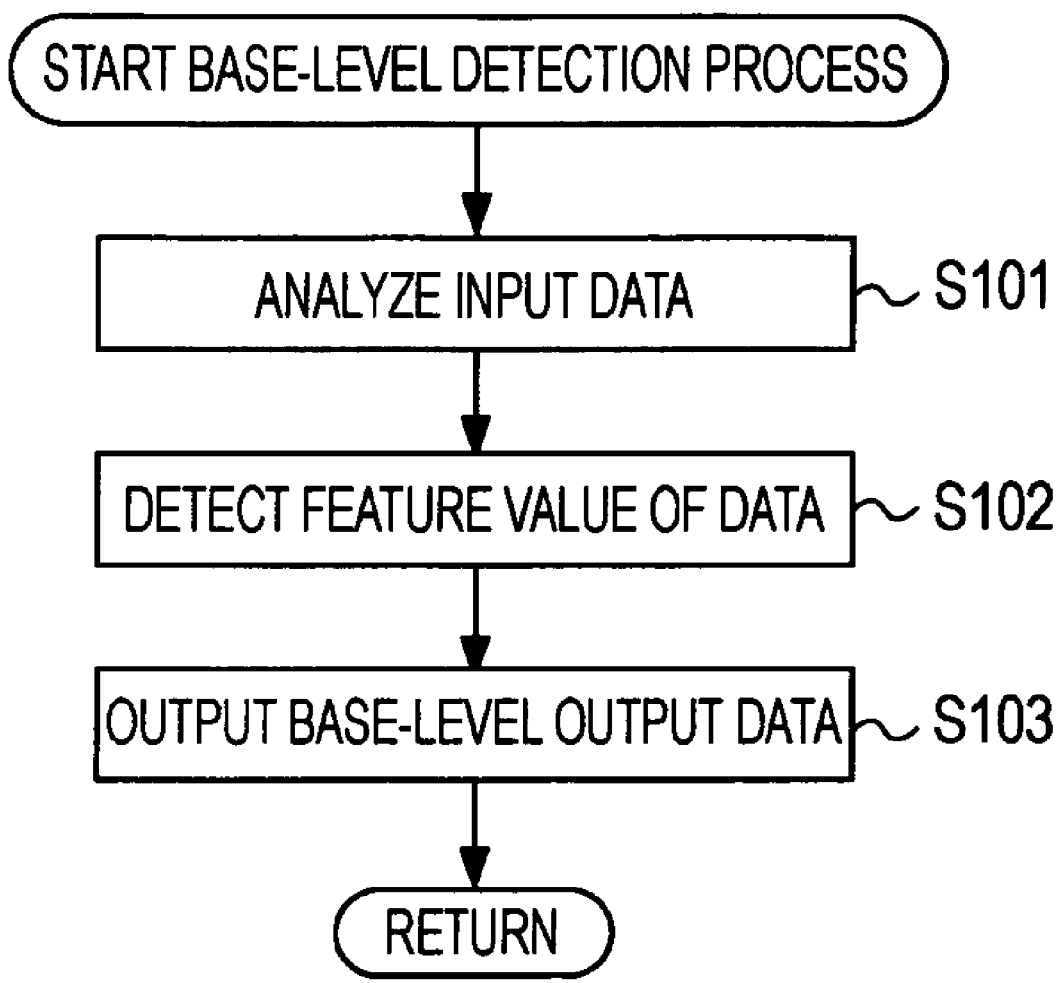
FIG. 9 is a flowchart showing an example of a base-level detection process.

In step S11, the base-level detection section 60 executes a base-level detection process described below with reference to FIG. 9 on each of the input data units (entry units of data) obtained in step S10.

The base-level detection process in step S11 shown in FIG. 8 will be described in detail with reference to a flowchart shown in FIG. 9.

In step S101, each of the detectors 102-1 to 102-N analyzes the corresponding input data unit. The detectors 102-1 to 102-N read image and audio data of, for example, one frame from the FIFOs 101-1 to 101-N, respectively, for analysis.

In step S102, each of the detectors 102-1 to 102-N detects a feature value such as information indicating a histogram of brightness of an image of the frame read in step S101, information indicating contrast of the image of the frame, or information indicating an audio level.

In step S103, the switch 122 outputs base-level detection data. The switch 122 reads data associating the feature values detected in step S102 with the positions of the frames of the input data in sequence from the FIFOs 103-1 to 103-N to output base-level output data. The base-level output data is therefore output as time-sequential data.

The processing of steps S101 to S103 is performed by each of the plurality of base-level detectors 61 connected in parallel. As described above with reference to FIG. 6, input data is divided into entry units of data and the entry units of data are supplied to the base-level detectors 61. Each of the base-level detectors 61 executes the processing of steps S101 to S103.

Figure 10:
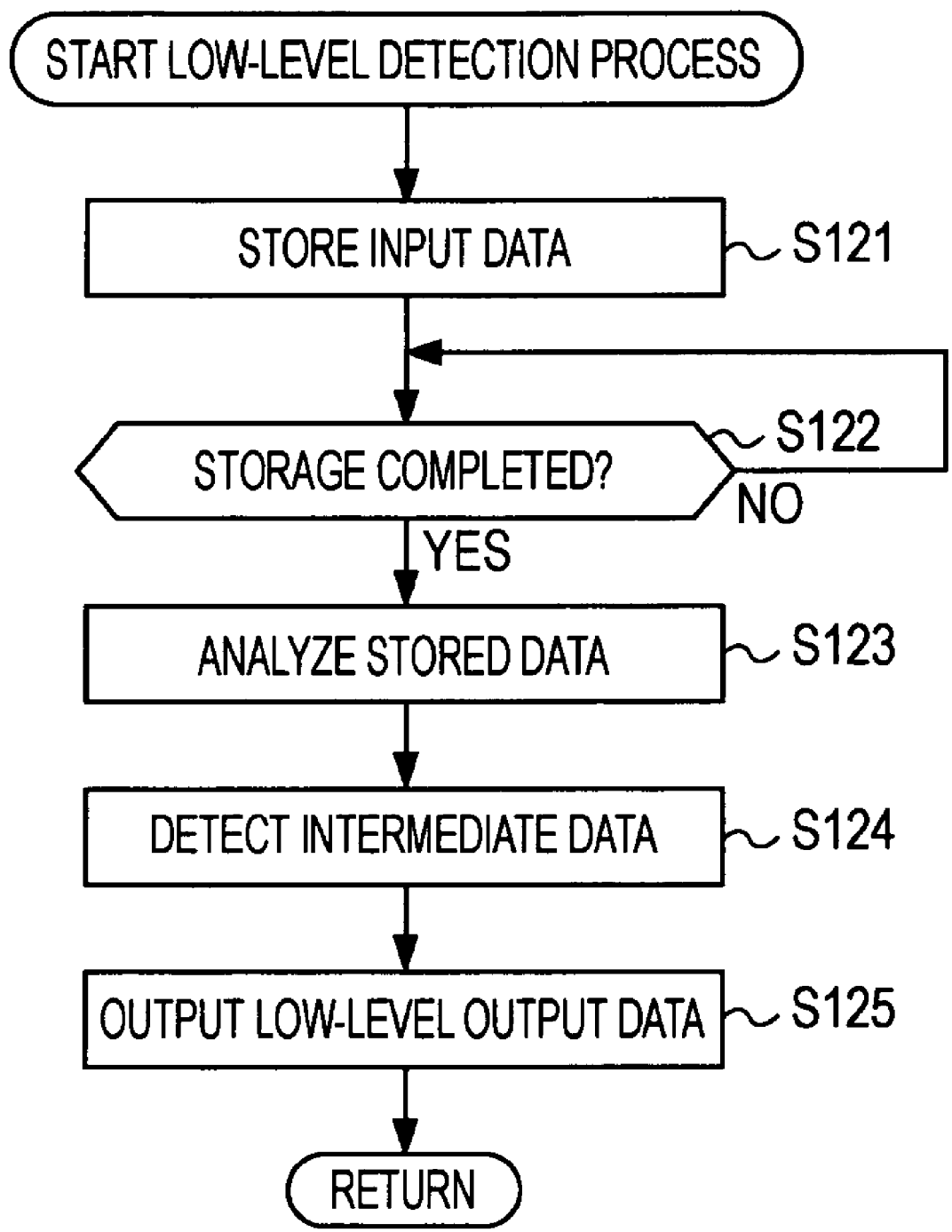
FIG. 10 is a flowchart showing an example of a low-level detection process.

Referring back to FIG. 8, after the processing of step S11, in step S12, the low-level detection section 70 executes a low-level detection process described below with reference to FIG. 10.

The low-level detection process in the step S12 shown in FIG. 8 will be described in detail with reference to a flowchart shown in FIG. 10.

In step S121, the low-level detector 71 stores input data into the buffer. The input data is the base-level output data output from the base-level detection section 60, and time-sequential base-level output data is stored in the finite delay buffer 202.

In step S122, the detector 201 of the low-level detector 71 determines whether or not an amount of base-level output data sufficient to detect intermediate data has been stored, and waits until it is determined that an amount of base-level output data sufficient to detect intermediate data has been stored. If it is determined in step S122 that an amount of base-level output data sufficient to detect intermediate data has been stored, the process proceeds to step S123.

In step S123, the detector 201 analyzes the stored data. For example, the detector 201 compares temporally earlier data (base-level output data) stored in the buffer 202 with temporally later data to determine, for example, whether or not a scene change occurs between the first several-second period and the next several-second period in the content, whether or not a period exists during which an audio level increases (or decreases) over a predetermined threshold value, or the like on the basis of the result of comparison.

In step S124, the detector 201 detects intermediate data on the basis of the result of analysis obtained in step S123.

In step S125, data associating the intermediate data detected by the detector 201 with the corresponding period of the input data is output as low-level output data.

The processing of steps S121 to S125 is executed by each of the plurality of low-level detectors 71 connected in parallel. As described above with reference to FIG. 5, the switch 73 selects, in sequence, the FIFOs 72-1 to 72-M to which the low-level output data is input from the plurality of low-level detectors 71, thereby outputting time-sequential low-level output data to the high-level detection section 80.

The low-level output data output from the low-level detection section 70 and supplied to the high-level detection section 80 is therefore time-sequential data, like the original input data that has not been divided by the demultiplexer 50.

Figure 11:
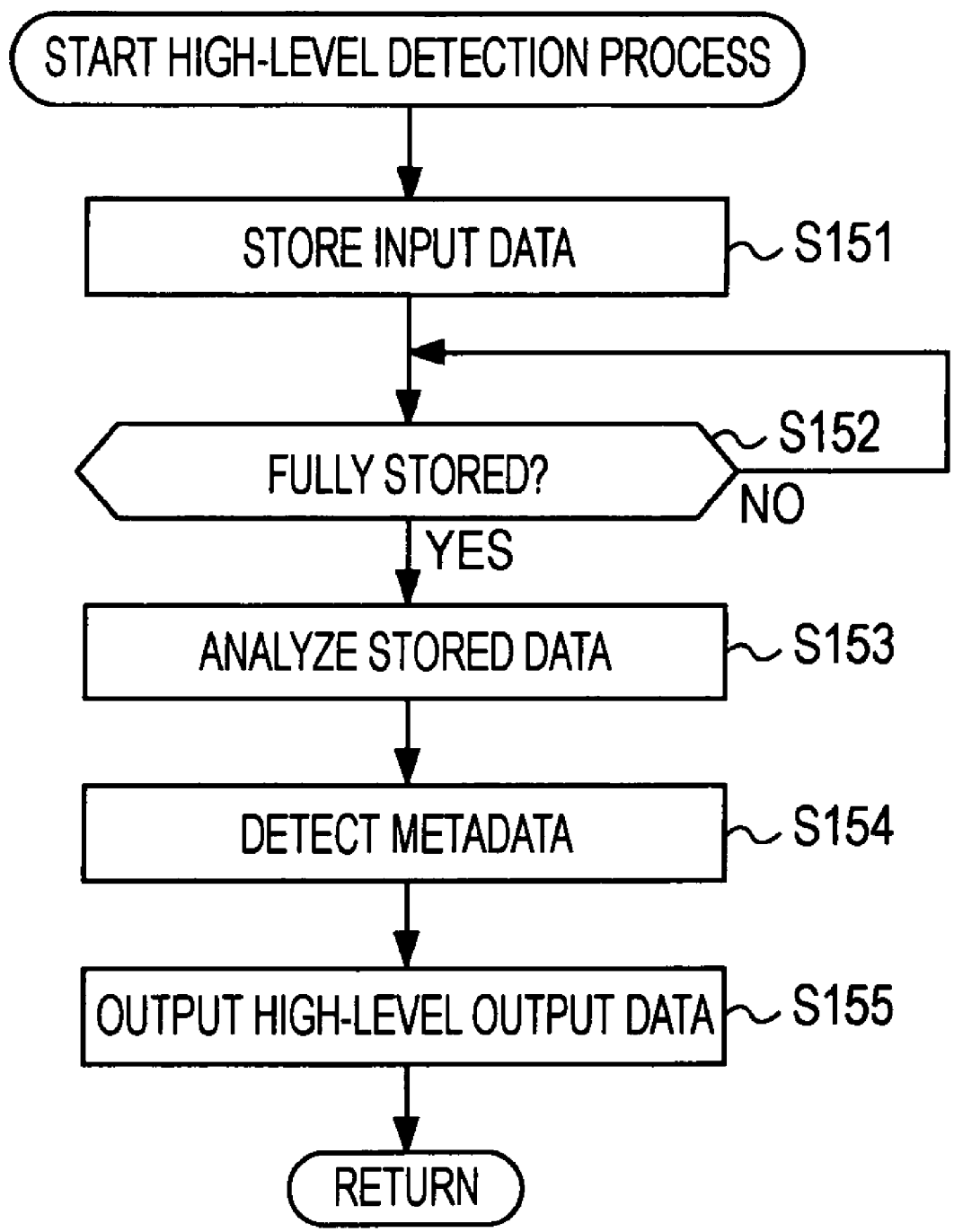
FIG. 11 is a flowchart showing an example of a high-level detection process.

Referring back to FIG. 8, after the processing of step S12, in step S13, the high-level detection section 80 executes a high-level detection process described below with reference to FIG. 11.

The high-level detection process in step S13 shown in FIG. 8 will be described in detail with reference to a flowchart shown in FIG. 11.

In step S151, the high-level detector 81 stores input data in the buffer 83. The input data is the low-level output data output from the low-level detection section 70, and time-sequential low-level output data is stored.

In step S152, the detector 82 determines whether or not an amount of low-level output data sufficient to detect metadata has been stored, and waits until it is determined that an amount of low-level output data sufficient to detect metadata has been stored. If it is determined in step S152 that an amount of low-level output data sufficient to detect metadata has been stored, the process proceeds to step S153.

In step S153, the detector 82 analyzes the stored data. For example, the detector 82 determines whether or not each predetermined period in the time-sequential low-level output data satisfies a predetermined condition for specifying a period such as a period of a highlight scene or a period of an advertisement in the content on the basis of the low-level output data output from the low-level detection section 70.

In step S154, the detector 82 detects metadata on the basis of the result of analysis obtained in step S153.

In step S155, data associating the metadata detected in step S154 with the corresponding period of the input data is output as high-level output.

Accordingly, the metadata extraction apparatus 40 performs the metadata extraction operation.

Figure 12:
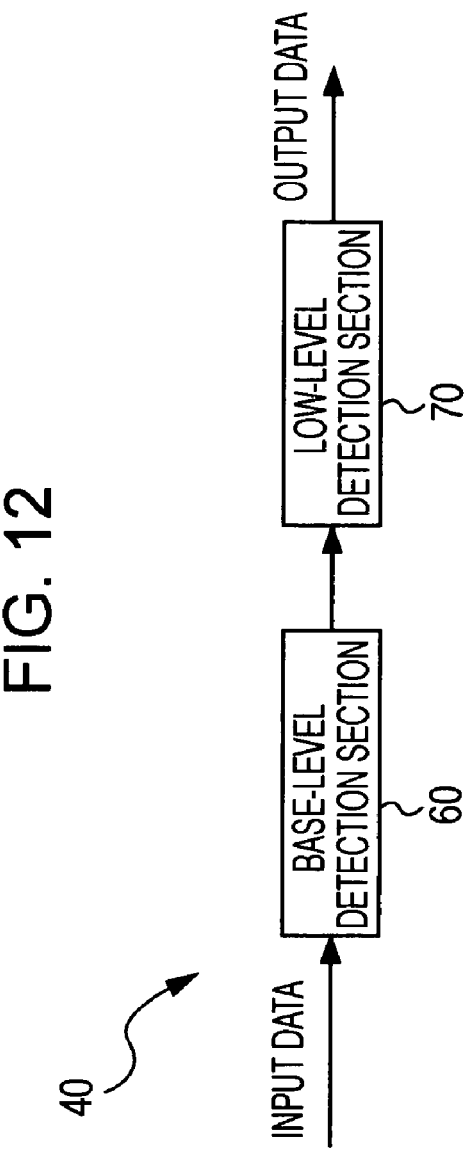
FIG. 12 is a block diagram showing an example structure of a metadata extraction apparatus according to another embodiment of the present invention.

In the foregoing description, the metadata extraction apparatus 40 is configured to analyze input data in three stages, namely, the base-level detection section 60, the low-level detection section 70, and the high-level detection section 80, to detect metadata by way of example. In an alternative example, as shown in FIG. 12, the metadata extraction apparatus 40 may include only the base-level detection section 60 and the low-level detection section 70.

In this example, the low-level output data output from the low-level detection section 70 is output data of the metadata extraction apparatus 40. The metadata may be, for example, information indicating whether or not a scene change occurs between the first several-second period and the next several-second period in the content, information indicating whether or not a period exists during which an audio level increases (or decreases) over a predetermined threshold value, or the like.

Figure 13:
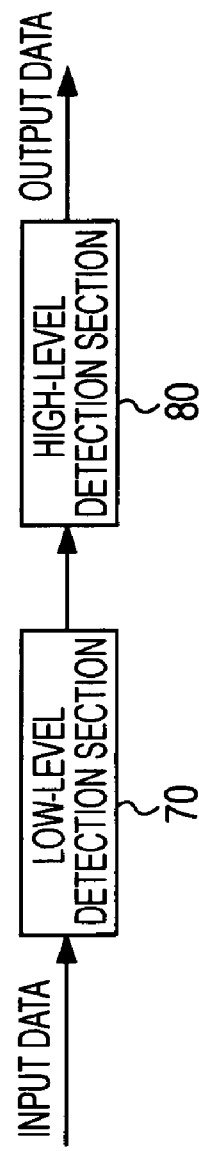
FIG. 13 is a block diagram showing an example structure of a metadata extraction apparatus according to still another embodiment of the present invention.

In another alternative example, as shown in FIG. 13, the metadata extraction apparatus 40 may include only the low-level detection section 70 and the high-level detection section 80.

In this example, input data is input directly to the low-level detection section 70. For example, the detector 201 of the low-level detector 71 detects a feature value or the like of the input data, and also detects intermediate data on the basis of the detected feature value.

In this case, the demultiplexer 50 may be a part of the low-level detection section 70, or may be provided independently.

Alternatively, the metadata extraction apparatus 40 may be include only the base-level detection section 60 and the high-level detection section 80.

In this case, the detector 82 of the high-level detector 81 detects intermediate data on the basis of the base-level output data, and also detects metadata on the basis of the detected intermediate data.

Alternatively, the structure described above with reference to FIGS. 3 and 5 may be applied to any other device such as a hardware device including no external storage unit. Alternatively, the structure described above with reference to FIGS. 4 and 5 may be applied to a firmware device such as an embedded device with a restricted storage capacity. Embodiments of the present invention are not limited to applications to apparatuses designed to extract metadata, and can widely be used for applications of rapid extraction or detection of, from time-sequential information, associated information regarding a predetermined period or a predetermined period within the time-sequential information, with an inexpressive structure.

In this specification, steps for executing the above-described series of processes may be executed in parallel or individually, as well as in time sequence in accordance with the order described herein.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for detecting, from time-sequential information continuously supplied for a given period of time, associated information regarding a time at which a piece of information satisfying a predetermined condition is supplied within the given period of time, the information processing apparatus comprising:
   dividing means for dividing the time-sequential information into a plurality of temporally successive information units at predetermined time intervals;
   feature value detecting means for processing in parallel the plurality of temporally successive information units for temporally successively detecting feature values of the plurality of temporally successive information units; and
   change-information detecting means for storing the feature values temporally successively detected by the feature value detecting means for a predetermined period of time and detecting a plurality of temporally successive pieces of feature-value-change information on the basis of the stored feature values and a current feature value detected by the feature value detecting means,
   wherein the change-information detecting means outputs the plurality of temporally successive pieces of feature-value-change information in sequence to output time-sequential associated information as the associated information,
   wherein the dividing means divides the time-sequential information into a plurality of temporally successive information units to be supplied to the feature value detecting means so that the N-th information unit and (N+1)-th information unit of the plurality of temporally successive information units are supplied to partially temporally overlap each other by an amount corresponding to the predetermined period of time during which the change-information detecting means stores the feature values.

2. The information processing apparatus according to claim 1, further comprising:

associated-information detecting means for storing the plurality of temporally successive pieces of feature-value-change information detected by the change-information detecting means for a certain period of time and analyzing the stored temporally successive pieces of feature-value-change information to detect time-sequential associated information as the associated information.

3. The information processing apparatus according to claim 1, wherein the feature value detecting means further divides each of the plurality of temporally successive information units obtained by the dividing means into information sub-units at shorter time intervals, and temporally successively detects feature values of the information sub-units.

4. The information processing apparatus according to claim 1, wherein the temporally successive information units are information units of a moving image or sound, and the associated information is detected as metadata of the moving image or sound.

5. An information processing method for an information processing apparatus configured to detect, from time-sequential information continuously supplied for a given period of time, associated information regarding a time at which a piece of information satisfying a predetermined condition is supplied within the given period of time, the information processing method comprising the steps of:

dividing the time-sequential information into a plurality of temporally successive information units at predetermined time intervals;

processing in parallel the plurality of temporally successive information units to temporally successively detect feature values of the plurality of temporally successive information units; and storing the temporally successively detected feature values for a predetermined period of time to detect a plurality of temporally successive pieces of feature-value-change information on the basis of the stored feature values and a currently detected feature value, wherein the plurality of temporally successive pieces of feature-value-change information are output in sequence to output time-sequential associated information as the associated information, wherein the time-sequential information is divided into a plurality of temporally successive information units to be supplied to the processing to temporally successively detect the features values so that the N-th information unit and (N+1)-th information unit of the plurality of temporally successive information units are supplied to partially temporally overlap each other by an amount corresponding to the predetermined period of time during which the temporally successively detected feature values are stored.

6. An information processing apparatus for detecting, from time-sequential information continuously supplied for a given period of time, associated information regarding a time at which a piece of information satisfying a predetermined condition is supplied within the given period of time, the information processing apparatus comprising:

dividing means for dividing the time-sequential information into a plurality of temporally successive information units at predetermined time intervals;

change-information detecting means for processing in parallel the plurality of temporally successive information units for temporally successively detecting feature values of the plurality of temporally successive information units, storing the temporally successively detected feature values for a predetermined period of time, and detecting a plurality of temporally successive pieces of feature-value-change information on the basis of the stored feature values and a currently detected feature value; and associated-information detecting means for storing the plurality of temporally successive pieces of feature-value-change information detected by the change-information detecting means for a certain period of time and analyzing the stored temporally successive pieces of feature-value-change information to detect time-sequential associated information as the associated information, wherein the dividing means divides the time-sequential information into a plurality of temporally successive information units to be supplied to the change-information detecting means so that the N-th information unit and (N+1)-th information unit of the plurality of temporally successive information units are supplied to partially temporally overlap each other by an amount corresponding to the predetermined period of time during which the change-information detecting means stores the feature values.

7. The information processing apparatus according to claim 6, wherein the temporally successive information units are information units of a moving image or sound, and the associated information is detected as metadata of the moving image or sound.

8. An information processing method for an information processing apparatus configured to detect, from time-sequential information continuously supplied for a given period of time, associated information regarding a time at which a piece of information satisfying a predetermined condition is supplied within the given period of time, the information processing method comprising the steps of:

dividing the time-sequential information into a plurality of temporally successive information units at predetermined time intervals;

processing in parallel the plurality of temporally successive information units to temporally successively detect feature values of the plurality of temporally successive information units, storing the temporally successively detected feature values for a predetermined period of time, and detecting a plurality of temporally successive pieces of feature-value-change information on the basis of the stored feature values and a currently detected feature value; and storing the detected plurality of temporally successive pieces of feature-value-change information for a certain period of time and analyzing the stored temporally successive pieces of feature-value-change information to detect time-sequential associated information as the associated information, wherein the time-sequential information is divided into a plurality of temporally successive information units to be supplied to the processing to temporally successively detect features values so that the N-th information unit and (N+1)-th information unit of the plurality of temporally successive information units are supplied to partially temporally overlap each other by an amount corresponding to the predetermined period of time during which the temporally successively detected feature values are stored.

9. An information processing apparatus for detecting, from time-sequential information continuously supplied for a given period of time, associated information regarding a time at which a piece of information satisfying a predetermined condition is supplied within the given period of time, the information processing apparatus comprising:
- a dividing section configured to divide the time-sequential information into a plurality of temporally successive information units at predetermined time intervals;
- a feature value detecting section configured to process in parallel the plurality of temporally successive information units to temporally successively detect feature values of the plurality of temporally successive information units; and
- a change-information detecting section configured to store the feature values temporally successively detected by the feature value detecting section for a predetermined period of time and to detect a plurality of temporally successive pieces of feature-value-change information on the basis of the stored feature values and a current feature value detected by the feature value detecting section,
- wherein the change-information detecting section outputs the plurality of temporally successive pieces of feature-value-change information in sequence to output time-sequential associated information as the associated information,
- wherein the dividing section divides the time-sequential information into a plurality of temporally successive information units to be supplied to the feature value detecting section so that the N-th information unit and (N+1)-th information unit of the plurality of temporally successive information units are supplied to partially temporally overlap each other by an amount corresponding to the predetermined period of time during which the change-information detecting section stores the feature values.

10. An information processing apparatus for detecting, from time-sequential information continuously supplied for a given period of time, associated information regarding a time at which a piece of information satisfying a predetermined condition is supplied within the given period of time, the information processing apparatus comprising:
- a dividing section configured to divide the time-sequential information into a plurality of temporally successive information units at predetermined time intervals;
- a change-information detecting section configured to process in parallel the plurality of temporally successive information units to temporally successively detect feature values of the plurality of temporally successive information units, to store the temporally successively detected feature values for a predetermined period of time, and to detect a plurality of temporally successive pieces of feature-value-change information on the basis of the stored feature values and a currently detected feature value; and
- an associated-information detecting section configured to store the plurality of temporally successive pieces of feature-value-change information detected by the change-information detecting section for a certain period of time and to analyze the stored temporally successive pieces of feature-value-change information to detect time-sequential associated information as the associated information,
- wherein the dividing section divides the time-sequential information into a plurality of temporally successive information units to be supplied to the change-information detecting section so that the N-th information unit and (N+1)-th information unit of the plurality of temporally successive information units are supplied to partially temporally overlap each other by an amount corresponding to the predetermined period of time during which the change-information detecting section stores the feature values.

* * * * *